Feb. 17, 1959 A. P. BRIETZKE 2,874,085
METHOD OF MAKING PRINTED CIRCUITS
Filed Oct. 27, 1953
Fig. 1
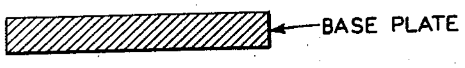
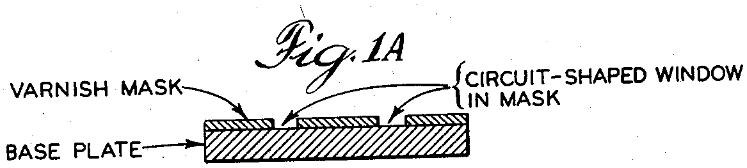
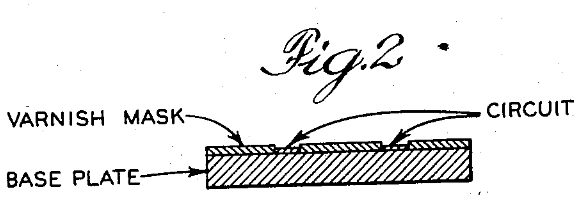
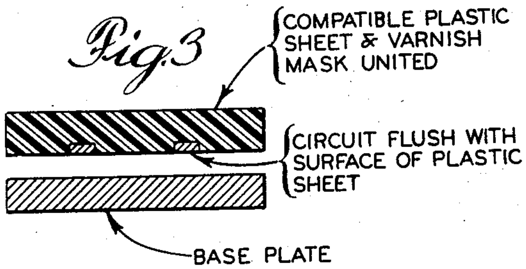
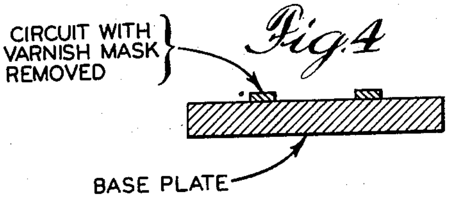
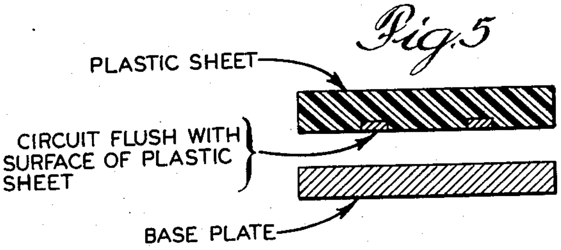
Fig. 1A, Fig. 2, Fig. 3, Fig. 4, Fig. 5
INVENTOR:
Adrian P. Brietzke,
BY Bair, Freeman & Molinare
ATTORNEYS.

2,874,085
Patented Feb. 17, 1959

2,874,085

METHOD OF MAKING PRINTED CIRCUITS

Adrian P. Brietzke, La Crosse, Wis., assignor to Northern Engraving & Manufacturing Co., La Crosse, Wis., a corporation of Wisconsin Application October 27, 1953, Serial No. 388,663

8 Claims. (Cl. 154—94)

My invention relates to an improved method of making printed circuits on a cured plastic backing and in which the circuit is recessed in the backing to provide a face flush with the face of the backing.

In printed circuits used for commutators and other devices where a conductor wipes over the face of the backing and printed circuit, it is desirable to provide a recessed construction in which the face of the circuit is flush with the face of the backing. Such construction minimizes the surface irregularities which oppose contact motion and thereby increase the required power to move the contactor. Also, when the printed circuit protrudes above the face of the backing, contact motion tends to break the printed circuit away and thus tends to destroy the precise circuit conformation which gives the printed circuit its utility.

In accordance with the method of the present invention a flush type printed circuit is formed on a curable plastic material in an operation integral with the curing process. The circuit is first deposited in a suitable conducting medium of the desired conformation on the polished face of a backing member, to which it is semi-adherent. Then the backing member is used as the face plate of a molding press to subject the plastic to the heat and pressure required for curing or molding and solidification. Upon removal of the backing member from the solidified plastic material, the printed circuit will be found to adhere to the plastic material and with the surface of the circuit flush with the face of the plastic material.

It is, therefore, a general object of the present invention to provide an improved method of making printed circuits on a moldable plastic sheet.

Further, it is an object of the present invention to provide a method of making printed circuits of the above type in which the surface of the printed circuit is flush with the face of the plastic.

Another object of the present invention is to provide a method of making printed circuits on a moldable plastic material in which the steps of making the printed circuit are integral with the plastic molding and solidifying process.

Still another object of the present invention is to provide an improved method of making printed circuits on a moldable plastic material wherein the backing plate used for the molding and solidifying process forms a transfer medium for the printed circuit.

Yet another object of the present invention is to provide an improved method of printing circuits on a moldable plastic backing which requires no parts other than those required for the molding process itself.

The novel features which I believe to be characteristic of the present invention are set forth with particularity in the appended claims. My invention, itself, however, both as to the materials employed and the steps performed, will best be understood by reference to the following description.

Briefly, the present invention contemplates forming the printed circuit on the backing plate used in the plastic-molding and curing operation. The plastic is then molded and cured under suitable heat and pressure with the printed face of the backing plate bearing against the face of the plastic. Upon separation of the cured plastic and the backing plate, the printed circuit will be found to adhere to the plastic.

The drawings illustrate and designate the various elements involved in the practice of this invention. Thus, Figure 1 illustrates the base plate, or backing plate. Figure 1A illustrates the base plate of Figure 1 with the windowed varnish mask that has been deposited thereon.

Figure 2 illustrates the base plate with windowed mask thereon after the circuit has been deposited onto the base plate through the window in the mask.

Figure 3 illustrates the resultant products obtained by one process of this invention, wherein the circuit is embedded in a plastic sheet with the surface of the circuit flush with the surface of the plastic sheet that has united with the mask that was on the base plate; and wherein the base plate is restored to the same condition as shown in Figure 1.

Figures 4 and 5 illustrate the appearance of the products during an alternate process, wherein Figures 4 and 5 illustrate a portion of the process that is an alternative to the portion of the process illustrated in Figure 3. That is to say that the preliminary portion of the two processes is illustrated by Figures 1, 1A and 2. In the alternate process, Figure 4 illustrates the base plate with circuit deposited thereon, as in Figure 2, but with the windowed mask removed. Figure 5 illustrates the resultant products of the circuit embedded in a plastic sheet with the operative surface of the circuit flush with the surface of the plastic sheet; and wherein the base plate is restored to the same condition as shown in Figure 1.

The plastic material to be used for the process may be any one of the moldable resinous materials which are molded and solidified by application of heat and pressure. The material may be phenol-formaldehyde resin, a melamine resin, an alkyd resin, or the like, which may be molded and solidified by the application of heat and pressure. Also, mixtures, such as a mixture of 30 percent alkyd resin and 70 percent styrene, may be used. Preferably, however, a thermo-setting resin, such as a phenol-formaldehyde resin is employed, in which case the solidification involved is the plastic curing process. Also, if desired, the resin may be used with a suitable filler, such as sheets of cloth to form a laminate when molding heat and pressure are applied.

In the application of heat and pressure, the resin is sandwiched between backing plates to which pressure is applied by any one of the molding press arrangements known in the art. The backing plates, as is well known in the art, must be of a material that will not adhere to the plastic at the completion of the process and are of proper surface polish and conformation to impart the desired smooth face to the molded product. In molding practice, stainless steel sheets are commonly used for this purpose because stainless steel possesses the necessary non-adhering qualities, can be highly polished, and withstands the chemical action of the molding compound. Other materials such as ordinary mild steel can, however, be employed for this purpose, as is well known in the art of molding plastic materials.

The semi-adherent deposit of conducting printed circuit material is preferably placed on the pressure plate or backing by masking the plate to form a window of the desired printed circuit conformation and then electroplating the conducting material through the windows onto the plate. The masking can conveniently be accomplished by a silk screening process.

The masking material preferably consists of a varnish compatible with the plastic which is cured to form the backing for the printed circuit so as to form a unitary structure with the backing. This is best accomplished by the use of a varnish in which the resinous component is the same resin as the plastic backing.

While silk screening is a particularly effective way to print the mask, other printing methods, such as photographic methods, or even hand painting, may be employed, as the only requirement is that of forming windows on the backing plate of conformation like the desired conformation of the printed circuit.

Another way to mask the backing plate is by printing the reversed circuit pattern in a "resist" such as commercial screening resist, printing ink dusted and fused with gilsonite, photo-resist, or some similar material. With this method the resist can be washed off with a suitable solvent, such as naphtha, alkaline solutions, or the like, after the conducting deposit has been made through the windows of the mask.

After the mask is formed, the conducting printed circuit material is deposited on the backing plate. Preferably, this is accomplished by electro-plating, using the backing plate as one electrode to deposit the conducting metal through the windows onto the backing plate. The current is continued until the desired thickness of the deposit is built up. Since the mask is electrically insulating and withstands the chemical action of the plating solution during plating, the conducting metal plates only in the window areas and does not deposit on the mask.

The printed circuit material is preferably of copper because of its high conductivity and low cast. Silver, gold, tin, nickel, rhodium, and other metals capable of being plated on the backing plate may be used if desired.

Alternatively, the conducting metal may be deposited by other means, such as, for example, cathode sputtering, vacuum evaporating, chemical reduction, or the like. With these methods of deposition, a mask made from a "resist" as described above is particularly suitable since the conducting metal is removed with the resist to the extent the metal extends beyond the confines of the window areas. Also, the metal may be deposited in successive layers of different metals, if desired.

When the conducting deposit having the conformation and thickness desired has been placed on the backing plate, the same is removed from the plating bath and washed and dried. If the deposit has been made by sputtering or evaporation, it is then necessary to remove the coating to the extent that it has adhered to the mask, although this need be only superficial, leaving the main portion of the masking varnish in place.

Upon completion of the foregoing, the plate bearing the conducting deposit and the varnish mask is placed in a molding press with the deposit facing the plastic material to be molded and cured. Pressure and heat are then applied as required for the molding and curing process, the pressure, temperature and time being determined by the composition and physical size of the material being molded and cured.

If desired, a number of sheets of plastic may be molded and cured simultaneously by sandwiching them between successive backing plates in the same fashion as in conventional manufacture of plastic sheets. In this instance the backing plates are thin sheets of metal. In such an arrangement, each plastic sheet bears against at least one backing plate face with a conducting printed circuit deposit so that when the press is opened and the plastic and backing plates removed, each plastic sheet is printed with one circuit.

Also, if desired, both backing members bearing against each sheet of plastic can carry a printed circuit. In this case the printed circuits will transfer to the opposite sides of the plastic sheet to print both sides simultaneously.

As an example of the actual conduct of the process of the present invention we have used the following successfully:

| | |
|---|---|
| Backing plate | Type 316 stainless steel, 15 inches by 24 inches. |
| Masking varnish | A phenol-formaldehyde resin (Resinox 497) varnish thickened with a silica compound (Santocell). (Silk screened onto the backing plate to 1 mill thick.) |
| Conducting deposit | Copper. (Electroplated to .003 inch thick.) |
| Molding compound | A phenol-formaldehyde (Resinox 497) varnish. (Used to saturate sheets of cambric cloth.) |
| Laminate | 15 inches wide, 24 inches long, ⅛ inch thick, before curing. |
| Curing | 1000 pounds per sq. in. pressure at 300° F. for 40 minutes. |

As a second example, the following process has been employed successfully:

| | |
|---|---|
| Backing plate | Type 430 stainless steel, 15 inches by 24 inches. |
| Masking varnish | Commercial screening etch resist. (Nazdar 5511 Jet Black.) (Silk screened onto the backing plate to 1 or 2 mills thick.) |
| Conducting deposit | Copper. (Electroplated to .005 inch thick). |
| Molding compound | Melamine resin solution (Rezamine 814). (Used to saturate sheets of cambric cloth.) |
| Laminate | 15 inches wide, 24 inches long. |
| Curing | 1000 pounds per sq. in. pressure at 310° F. |

It will be observed that with the process above described the backing plate used in the molding process forms a transfer plate for the printed circuit. Also, the smooth polished face of the backing plate forms the surface upon which the surface of the printed circuit and the masking varnish temporarily adhere, a surface that is polished and assures an exact surface continuity between the surface of the plastic and the surface of the conductor.

The backing plate here referred to may either be a thin metal sheet sandwiched between successive sheets of plastic, or between a sheet of plastic and the bed of the press, or it can be the bed itself. For reasons of economy it is generally desirable to use thin metal sheets for this purpose and to use a number of plastic sheets in a stack.

While I have described the process of the present invention with respect to molding flat sheets of plastic material, it will be understood that it may also be used to mold other shapes, such as arcuate shapes, the backing plate and the press being shaped to impart the desired shape to the molded plastic.

While I have shown and described specific embodiments of the present invention, it will, of course be understood that various modifications and alternatives may be made without departing from the true spirit and scope of the invention. I therefore intend by the appended claims to cover all variations and modifications falling within their true spirit and scope.

What I claim as new and desire to secure by Letters Patent of the United States is:

1. The process of preparing a plastic sheet having a flush printed circuit of predetermined conformation and thickness comprising the steps of: providing a stainless steel backing plate having a smooth continuous surface, depositing an electrically non-conductive mask onto said smooth continuous surface of the backing plate to define a window in the shape of the circuit; applying the printed circuit through the window onto the backing plate in a semi-adherent deposit; removing the mask, thereby leaving said printed circuit embossed on said backing plate; pressing a sheet of uncured thermosetting resin against the side of the backing plate having said circuit embossed thereon to embed the circuit in the resin, curing the resin to set it; and then separating said cured resin sheet with said circuit embedded therein from the smooth continuous surface of said backing plate, thereby restoring said stainless steel backing plate to substantially its original condition.

2. The process of preparing a plastic sheet having a flush printed circuit of predetermined conformation and thickness comprising the steps of: providing a stainless steel backing plate having a smooth continuous surface, silk-screening an electrically non-conductive mask onto said smooth continuous surface of the backing plate to define a window in the shape of the circuit; electroplating said masked surface of the backing plate to deposit the circuit through the window onto the backing plate in a semi-adherent deposit; removing the mask, thereby leaving said printed circuit embossed on said smooth surface of the backing plate; pressing a sheet of uncured thermosetting resin against the side of the backing plate having said circuit embossed thereon to embed the circuit in the resin, curing the resin to set it; and then separating said cured resin sheet with said circuit embedded therein from the smooth continuous surface of said backing plate, thereby restoring said stainless steel backing plate to substantially its original condition.

3. The process of preparing a plastic sheet having a flush printed circuit of predetermined conformation and thickness comprising the steps of: providing a stainless steel backing plate having a smooth continuous surface, depositing an electrically non-conductive mask, which is soluble in a mask-attacking solvent, onto said smooth continuous surface of the backing plate to define a window in the shape of the circuit; applying the printed circuit through the window onto the backing plate in a semi-adherent deposit; applying a mask-attacking solvent to the mask to remove the mask, thereby leaving said printed circuit embossed on said smooth surface of the backing plate; pressing a sheet of uncured thermosetting resin against the side of the backing plate having said circuit embossed thereon to embed the circuit in the resin, curing the resin; and then separating said cured resin sheet with said circuit embedded therein from the smooth continuous surface of said backing plate, thereby restoring said stainless steel backing plate to substantially its original condition.

4. The process for preparing a plastic sheet having an integral printed circuit therein with the surface of the printed circuit flush with the surface of said plastic sheet which comprises: providing a metal backing plate with a smooth, continuous surface of a nature that inhibits tight adhesion of a deposited metal thereto, then making a deposit of metal in a pre-determined pattern which defines the circuit, and in semi-adherent bonding relation onto said smooth continuous surface of the metal backing plate, applying a sheet of uncured deformable thermosetting resin over the surface of the backing plate onto which said deposit of metal has been made, applying pressure to said sheet to cause flow of the resin into engagement with whatever surfaces of metal are exposed and simultaneously curing the resin to form a cured resin sheet with the circuit embedded therein flush with the surface of said cured resin sheet and to effect a bond between said cured resin and the deposit of metal of greater strength than the semi-adherent bond between the metal deposit and the metal backing plate, and separating the cured resin sheet with circuit embedded flush therein from the smooth, continuous surface of said metal backing plate leaving said smooth, continuous surface of said metal backing plate substantially in its original condition.

5. A process for preparing a plastic sheet having an integral printed circuit flush with the surface thereof which comprises providing a stainless steel backing plate with a smooth continuous surface, depositing a mask of varnish on said smooth continuous surface of the backing plate to define a window in the shape of the circuit, electroplating the masked surface of the plate to deposit the circuit through the window onto said smooth continuous surface in a semi-adherent deposit, placing a sheet of deformable thermosetting resin compatible with the resin component of the varnish over the electroplated surface, applying pressure to said sheet to form a unitary laminate with said varnish having the printed circuit embedded therein flush with the varnish surface, and separating the laminate from the smooth continuous surface of the plate leaving the plate substantially in its original condition.

6. The process for preparing a plastic sheet having an integral printed circuit flush with the surface thereof which comprises providing a stainless steel backing plate with a smooth continuous surface, depositing a mask of uncured thermosetting resin varnish on said smooth continuous surface of the backing plate to define a window in the shape of the circuit, electroplating the masked surface of the plate to deposit the circuit through the window onto said smooth continuous surface in a semi-adherent deposit, placing a cellulose sheet saturated with uncured thermosetting resin over the electroplated surface, applying pressure to said saturated sheet and simultaneously curing the thermosetting resin in said varnish and in said sheet to form a unitary laminate with said varnish having a printed circuit embedded therein flush with the varnish surface, and separating the laminate from the smooth continuous surface of the plate leaving the plate substantially in its original condition.

7. A process for preparing a plastic sheet having an integral printed surface flush with the surface thereof which comprises providing a stainless steel backing plate with a smooth continuous surface, depositing through a silk screen a mask of uncured thermosetting phenolic resin varnish on said smooth continuous surface of the backing plate to define a window in the shape of the circuit, electroplating the masked surface of the plate to deposit the circuit through the window onto said smooth continuous surface in a semi-adherent deposit, placing a cellulose sheet saturated with uncured thermosetting phenolic resin over the electroplated surface, applying heat and pressure to said saturated sheet to cure the resin in the varnish and in the sheet and form a unitary laminate with said varnish having a printed circuit embedded therein flush with the varnish surface, and separating the laminate from the smooth continuous surface of the plate leaving the plate substantially in its original condition.

8. The process of claim 7 wherein said phenolic resin is replaced with a melamine resin.

References Cited in the file of this patent

UNITED STATES PATENTS

| | | |
|---|---|---|
| 509,951 | Shroder | Dec. 5, 1893 |
| 634,523 | Epp | Oct. 10, 1899 |
| 2,447,541 | Sabee et al. | Aug. 24, 1948 |
| 2,451,725 | Franklin | Oct. 19, 1948 |
| 2,666,008 | Eislein et al. | Jan. 12, 1954 |
| 2,692,190 | Pritikin | Oct. 19, 1954 |